United States Patent [19]
Mweene

[11] Patent Number: 5,877,951
[45] Date of Patent: Mar. 2, 1999

[54] CIRCUIT FOR AND METHOD OF DECREASING CONDUCTED AND RADIATED ELECTROMAGNETIC INTERFERENCE OF A POWER CONVERTER AND A FULL BRIDGE POWER CONVERTER EMPLOYING THE SAME

[75] Inventor: Loveday H. Mweene, Mesquite, Tex.

[73] Assignee: Lucent Technologies Inc., Murray Hill, N.J.

[21] Appl. No.: 949,426

[22] Filed: Oct. 14, 1997

[51] Int. Cl.[6] .................................................... H02M 3/24
[52] U.S. Cl. .............................. 363/98; 363/41; 363/132; 363/17
[58] Field of Search ................................. 363/41, 58, 98, 363/132, 17

[56] References Cited

U.S. PATENT DOCUMENTS 5,477,131  12/1995  Gegner ..................................... 323/222
5,710,698   1/1998  Lai et al. .................................. 363/56

OTHER PUBLICATIONS

Publication entitled "A Novel Zero–Voltage–Switched Half-–Bridge Converter with Active Current–Clamped Transformer" by Koji Yoshida, Tatsuo Maeoka, Takuya Ishii, Hiroyuki Handa and Tamotsu Ninomiya from IEEE Power Electronics Specialists Conference Record; 1996: 6 pages.

Publication entitled "A 1 kW, 500 kHz Front–End Converter for a Distributed Power Supply System" by Loveday H. Mweene, Chris A. Wright and Martin F. Schlecht 1989 IEEE; pp. 423–432.

Paper entitled "The Design of Front–End DC–DC Converters of Distributed Power Supply Systems with Improved Efficiency and Stability" by Loveday H. Mweene pp. 25–77; 1992, Massachusetts Institute of Technology Doctrolathesis.

*Primary Examiner*—Shawn Riley

[57] ABSTRACT

For use in a power converter having a controlled full bridge coupled to a transformer, the bridge delivering power received from an input of the power converter to a primary winding of the transformer, a circuit for, and method of decreasing conducted and radiated electromagnetic interference of the power converter. In one embodiment, the circuit includes a switching circuit, coupled across at least a portion of the primary winding, that closes to short the portion as a function of a state of the full bridge to stabilize a voltage level of the primary winding and reduce ringing caused by the intrinsic capacitance, thereby decreasing the conducted and radiated electromagnetic interference.

20 Claims, 8 Drawing Sheets

FIG. 4

CIRCUIT FOR AND METHOD OF DECREASING CONDUCTED AND RADIATED ELECTROMAGNETIC INTERFERENCE OF A POWER CONVERTER AND A FULL BRIDGE POWER CONVERTER EMPLOYING THE SAME

TECHNICAL FIELD OF THE INVENTION

The present invention is directed, in general, to power conversion and, more specifically, to pulse width modulation (PWM)-controlled full bridge power converters having lower noise and to methods of operating such power converters to produce less noise.

BACKGROUND OF THE INVENTION

The development of efficient, low noise power converters is a continuing goal in the field of power electronics. Power converters are typically employed in applications that require conversion of an input DC voltage to various other DC voltages, higher or lower than the input DC voltage. Examples include telecommunications and computer systems wherein high voltages are converted down to lower voltages needed to operate the systems. Power converters generally suffer from problems such as switching losses, switching noise and common-mode power transformer noise. Switching losses reduce system efficiency, resulting in greater input power requirements for the same output power. Switching and transformer noise, both conducted and radiated, require filtering to prevent or reduce interference with other sensitive electronic equipment.

Current power converter designs often implement one of two full bridge topologies: the conventional full bridge and the phase-shifted full bridge. Both topologies include four switches, typically power metal-oxide semiconductor field-effect transistors (MOSFETs), operated in alternating pairs, an input/output isolation and step-up/step-down transformer, an output rectifier, and an output filter. A feedback regulator or controller is included to control the switches.

The conventional full bridge operates generally as follows. The switches are arranged in two diagonal pairs that are alternately turned on for a fraction of a switching period to apply opposite polarities of the input DC voltage across the primary of the transformer. Thus the switches operate to convert the input DC voltage into an AC voltage required to properly operate the transformer. Between conduction intervals of the diagonal pairs, all the switches are turned off for a fraction of the switching period. Ideally, this should force a voltage across the primary of the transformer to zero. A rectified voltage of the transformer should, therefore, ideally be a square wave with an average value proportional to a duty ratio of the diagonal pairs.

The output filter decomposes the rectified voltage into AC and DC components. The DC component is an output voltage of the power converter. The output voltage is generally fixed. The feedback regulator, therefore, monitors the output voltage and adjusts the duty ratio of the diagonal switches to maintain the output voltage at a constant level as the input DC voltage and load current changes.

In practice, the rectified voltage is not a perfect square wave, however, because turning off all the switches induces a ring between a leakage inductance of the transformer and a parasitic capacitance of the switches. The ringing dissipates energy, thereby reducing the efficiency of the power converter. The ringing also gives rise to significant conducted and radiated electromagnetic interference.

The phase-shifted full bridge power converter was developed to alleviate the switching loss and switching noise problems of the conventional full bridge. The construction of the phase-shifted full bridge is essentially identical to that of the conventional full bridge. Its advantages result, however, from the operation of the switches to produce a zero voltage across the transformer. Instead of turning off both switches of each diagonal pair to begin the zero voltage period, the phase-shifted full bridge turns off only one switch of the pair. A switch from the alternate pair is then turned on, allowing the current in the primary circuit to circulate at zero voltage through the two switches. The two switches clamp the voltage across the transformer at zero, thereby eliminating the ringing behavior suffered by the conventional bridge when the switches are off. By clamping both ends of the transformer to one rail, then to the other rail, however, the phase-shifted full bridge induces transients on an intrinsic primary to secondary capacitance of the transformer. As a capacitor potential is alternately charged from rail to rail, common-mode noise is thereby generated.

Accordingly, what is needed in the art is a system and method is for clamping the voltage across the transformer to zero (to reduce switching losses and switching noise) without inducing noise on the intrinsic capacitance of the transformer, thereby generating less common-mode noise in full bridge power converters of the type described above.

SUMMARY OF THE INVENTION

To address the above-discussed deficiencies of the prior art, the present invention provides, for use in a power converter having a controlled full bridge coupled to a transformer, the bridge delivering power received from an input of the power converter to a primary winding of the transformer, a circuit for, and method of decreasing conducted and radiated electromagnetic interference of the power converter. In one embodiment, the circuit includes a switching circuit, coupled across at least a portion of the primary winding, that closes to short the portion as a function of a state of the full bridge to stabilize a voltage level of the primary winding, thereby decreasing the conducted and radiated electromagnetic interference.

The present invention therefore avoids alternately coupling the primary winding of the transformer to the rails of the input voltage, which causes the above-described instability in the primary winding and gives rise to common-mode noise at the power converter input.

In one embodiment of the present invention, the full bridge is pulse width modulation ("PWM")-controlled. Of course, the full bridge may be supplied with any switching waveform, PWM or otherwise.

In one embodiment of the present invention, the power converter further has a controller and the full bridge contains switches that intermittently couple the primary winding to the input of the power converter, the controller providing control signals to the switching circuit and the switches in the full bridge. In an embodiment to be illustrated and described, a single controller provides control signals to the switches in the full bridge and the switching circuit that intermittently short the primary winding. Of course, separate controllers may be employed instead.

In one embodiment of the present invention, the power converter further has an output filter interposed between a secondary winding of the transformer and the output of the power converter. Of course, the filter, which may be conventional in design, is not required in the broad scope of the present invention.

In one embodiment of the present invention, the power converter further has a controller and the full bridge comprises four switches controlled by the controller in alternating pairs to deliver power received from the input of the power converter to the primary winding. Those skilled in the art are familiar with the manner in which full bridges are controlled to provide a rectified voltage.

In one embodiment of the present invention, the switching circuit includes two back to back metal-oxide semiconductor field effect transistors ("MOSFETs"). Other controllable switches are within the broad scope of the present invention.

In one embodiment of the present invention, the switching circuit closes to short the portion when the voltage level of the primary winding is substantially half of an input voltage of the power converter. Of course, the present invention advantageously avoids coupling the primary winding to the input voltage. Therefore, any voltage within the full range of the input voltage would serve to reduce conducted and radiated electromagnetic interference of the power converter.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
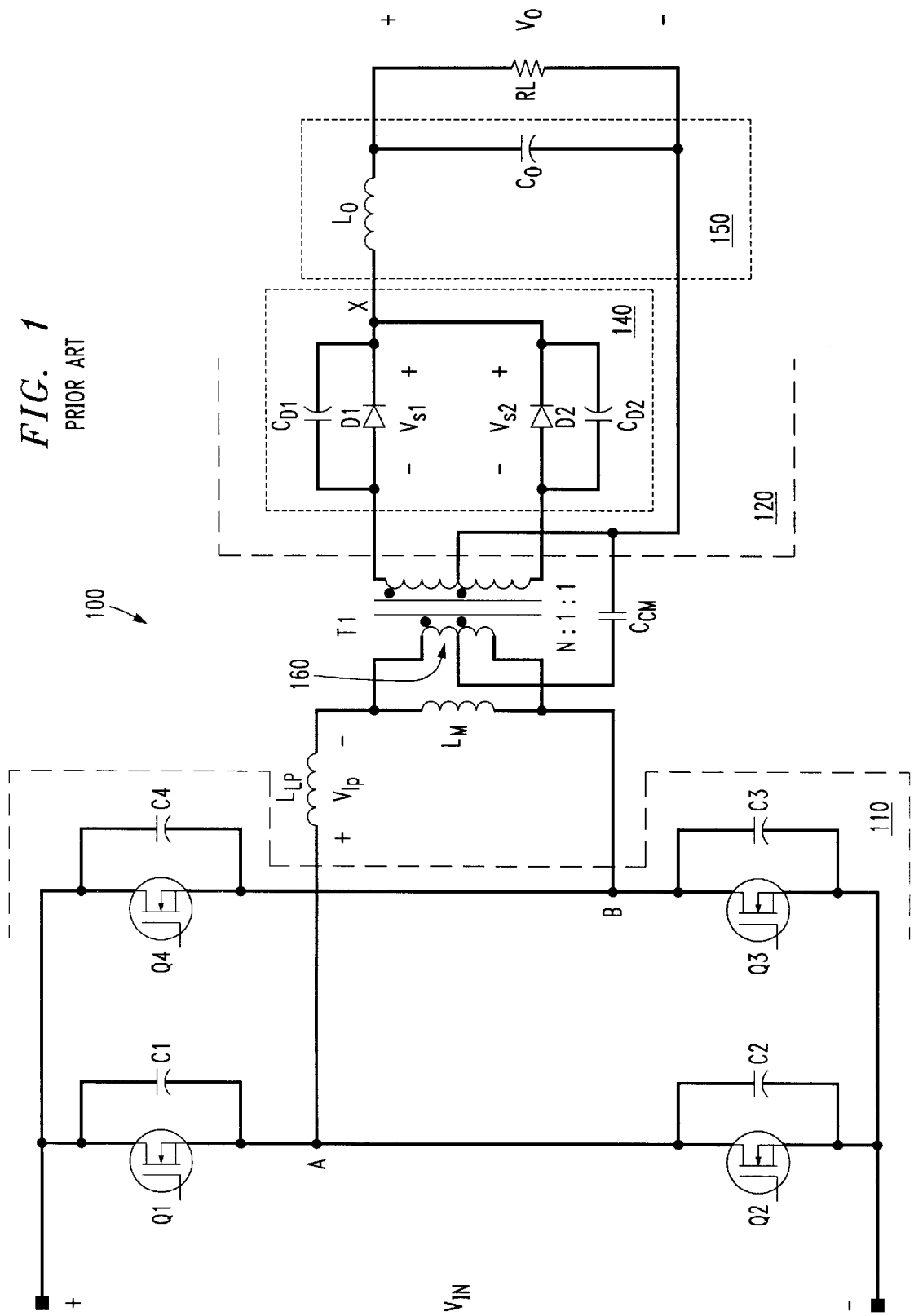
FIG. 1 illustrates a schematic diagram of a prior art full bridge power converter.

Referring initially to FIG. 1, illustrated is a schematic diagram of a prior art, full bridge power converter 100 previously discussed. The full bridge power converter 100 is coupled to a source of electrical power (not shown) and provides power to a load (designated by resistor RL) coupled thereto. The full bridge power converter 100 includes a transformer T1, with a leakage inductance $L_{LP}$ and a magnetizing inductance $L_M$. The transformer T1 has a primary winding 160 and two secondary windings of the same turns ratio (with respect to the primary winding 160).

The transformer T1 further has a primary to secondary common-mode capacitance $C_{CM}$. The primary to secondary common-mode capacitance $C_{CM}$ is a distributed capacitance. For simplicity, however, the primary to secondary common-mode capacitance $C_{CM}$ is represented as a capacitor coupling a midpoint of the primary winding to a midpoint of the secondary winding. The full bridge power converter 100 further includes a full bridge circuit (full bridge) 110 and a secondary side circuit 120.

The full bridge 110 includes a first switch Q1, with a first parasitic capacitance C1, coupled to a first end of the primary winding 160. The full bridge 110 further includes a second switch Q2, with a second parasitic capacitance C2, also coupled to the first end of the primary winding 160. The full bridge 110 further includes a third switch Q3, with a third parasitic capacitance C3, coupled to a second end of the primary winding 160. The full bridge 110 still further includes a fourth switch Q4, with a fourth parasitic capacitance C4, also coupled to the second end of the primary winding 160.

The secondary side circuit 120 includes a rectifier 140 consisting of a first rectifier diode D1, with a first intrinsic diode capacitance $C_{D1}$, and a second rectifier diode D2, with a second intrinsic diode capacitance $C_{D2}$, coupled to the secondary windings of the transformer T1. The secondary side circuit 120 further includes an output filter 150, having an inductive element $L_O$ and a capacitive element $C_O$, coupled to the rectifier 140 and the output of the power converter. The output filter 150 provides a filtered output voltage $V_O$ to power the load RL.

Figure 2A:
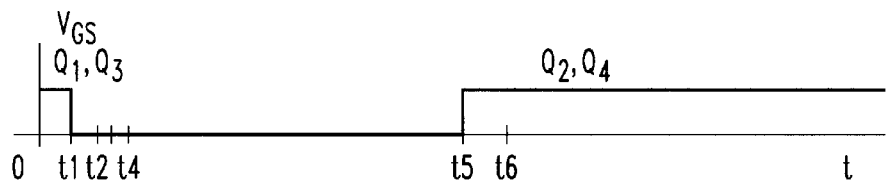
FIGS. 2A through 2G illustrate graphical representations of a plurality of switching transitions of selected elements of the prior art full bridge power converter of FIG. 1 in a conventional mode of operation.
Figure 2B:
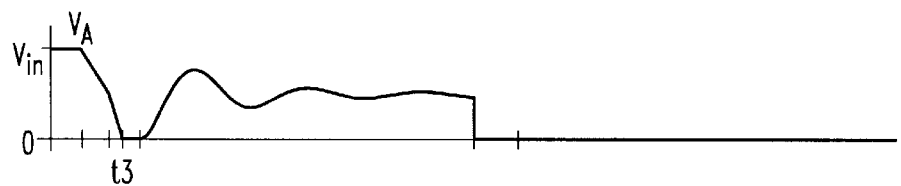
Figure 2C:
Figure 2D:
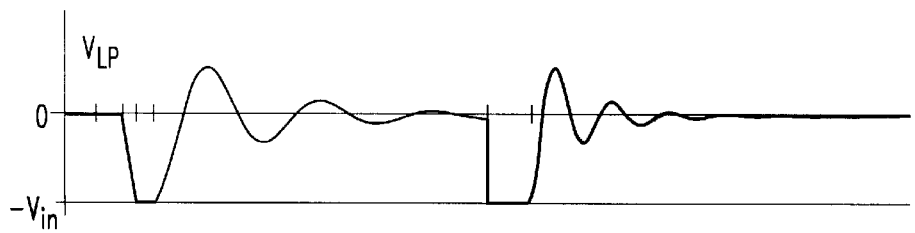
Figure 2E:
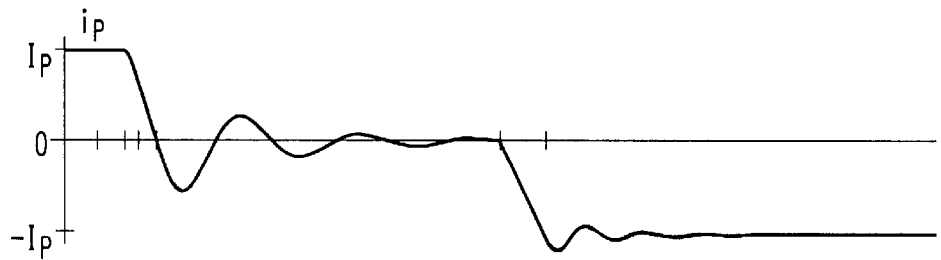
Figure 2F:
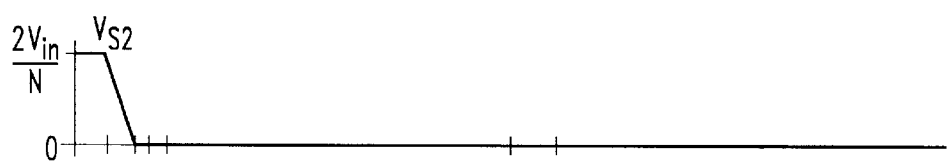
Figure 2G:
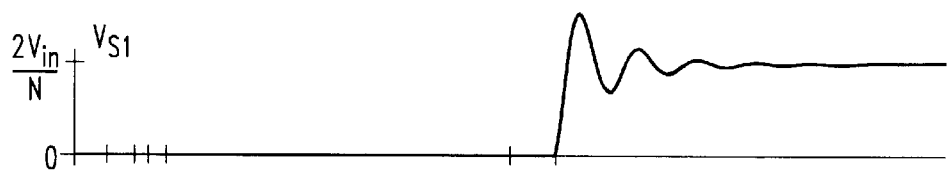

Turning now to FIGS. 2A through 2G, and with continuing reference to FIG. 1, illustrated are graphical representations of a plurality of switching transitions of selected elements of the full bridge power converter 100 shown in FIG. 1 in a conventional mode of operation. In particular, FIG. 2A represents control voltages applied to the first, second, third, and fourth switches Q1, Q2, Q3, Q4. FIG. 2B represents a first voltage $V_A$ at a first node A. FIG. 2C represents a second voltage $V_B$ at a second node B. FIG. 2D represents a leakage voltage $V_{LP}$ across the leakage inductance $L_{LP}$. FIG. 2E represents a primary current $I_P$ through the primary winding 160. FIG. 2F represents a second diode voltage $V_{S2}$ across the second rectifier diode D2. FIG. 2G represents a first diode voltage $V_{S1}$ across the first rectifier diode D1.

The switches in the conventional full bridge 110 are divided into two alternately conducting diagonal pairs. During a first interval (prior to time t1), for a first duty cycle D, the first and third switches Q1, Q3 conduct to apply an input voltage $V_{IN}$ across the primary winding 160 of the transformer T1. During a second interval (time t1 to t5), for a second duty cycle 1-D, all the switches are turned off. Then, during a third interval, for a first duty cycle D, the second and fourth switches Q2, Q4 are on. The voltage applied across the primary winding during the third interval is opposite in polarity to that of the first interval. The switches are then turned off for a second duty cycle 1-D during the fourth interval.

Ideally, during the second and fourth intervals, a voltage across the primary 160 should be zero. In practice, however, turning off the switches induces a ring between a leakage inductance of the transformer T1 and a parasitic capacitance of the switches Q1, Q2, Q3, Q4 (between time t2 and t5). Energy is dissipated, reducing an efficiency of the full bridge power converter 100. In addition, the ringing also gives rise to significant conducted and radiated electromagnetic interference.

A phase-shifted mode of operation was developed to alleviate the switching loss and switching noise problems of the full bridge power converter 100.

Figure 3A:
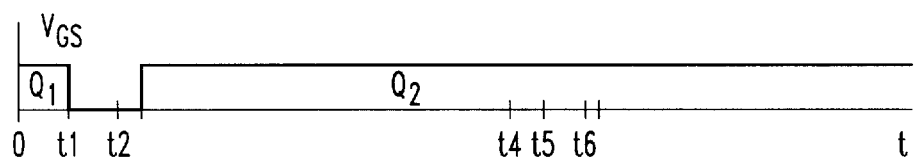
FIGS. 3A through 3H illustrate graphical representations of a plurality of switching transitions of selected elements of the prior art full bridge power converter of FIG. 1 in a phase-shifted mode of operation.
Figure 3B:
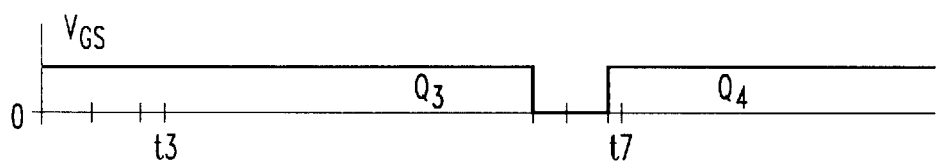
Figure 3C:
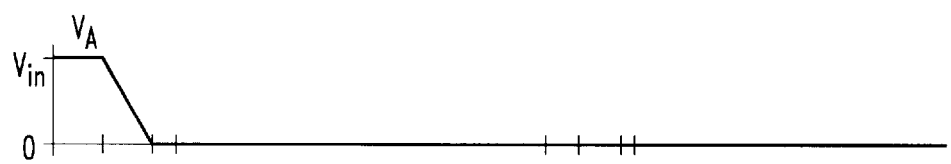
Figure 3D:
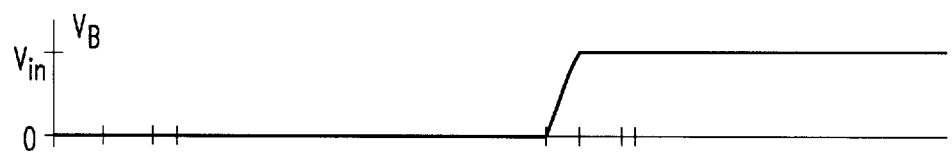
Figure 3E:
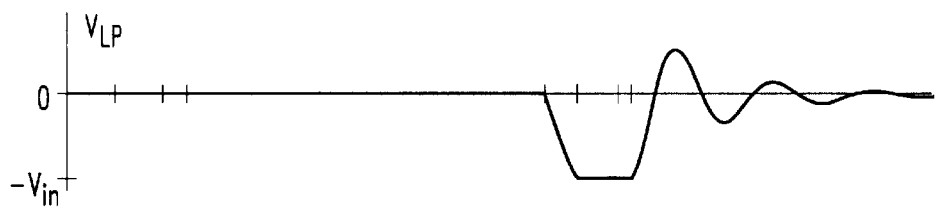
Figure 3F:
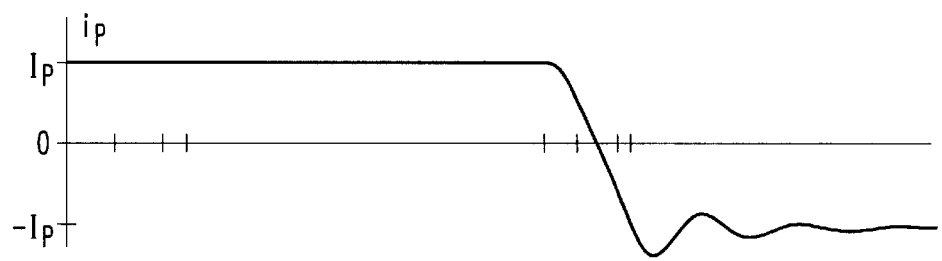
Figure 3G:
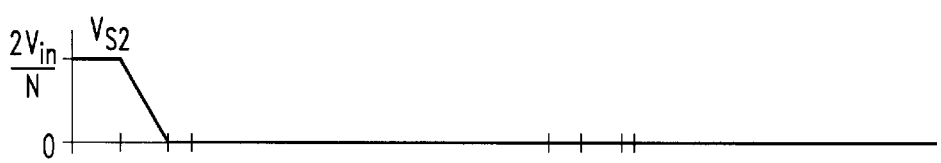
Figure 3H:

Turning now to FIGS. 3A through 3H, and with continuing reference to FIG. 1, illustrated are graphical representations of a plurality of switching transitions of selected elements of the full bridge power converter 100 shown in FIG. 1 in a phase-shifted mode of operation. In particular, FIG. 3A represents control voltages applied to the first and second switches Q1, Q2. FIG. 3B represents control voltages applied to the third and fourth switches Q3, Q4. FIG. 3C represents a first voltage $V_A$ at a first node A. FIG. 3D represents a second voltage $V_B$ at a second node B. FIG. 3E represents a leakage voltage $V_{LP}$ across the leakage inductance $L_{LP}$. FIG. 3F represents a primary current $I_P$ through the primary winding 160. FIG. 3G represents a second diode voltage $V_{S2}$ across the second rectifier diode D2. FIG. 3H represents a first diode voltage $V_{S1}$ across the first rectifier diode D1.

With continuing reference FIG. 1, the phase-shifted full bridge power converter 100 uses a pulse width modulation (PWM) controller (not shown) for controlling the switching cycles of the first, second, third, and fourth switches Q1, Q2, Q3, Q4. The controller activates the first switch Q1 and the third switch Q3 during a first interval (prior to time t1), for a first duty cycle D, causing an input voltage $V_{IN}$ to be impressed across the primary winding 160 of the transformer T1. The first rectifier diode D1 is on, conducting a secondary current to the output filter 150.

During a second interval (time t1 to t6), for a second duty cycle 1-D, the primary function is to set the voltage across the primary winding 160 to zero. The controller performs this function by deactivating the first switch Q1 at the end of the first interval (at a first time period t1 in FIG. 3A). The primary current $I_P$ discharges the first and second parasitic capacitances C1, C2, resulting in the first voltage $V_A$ ringing down from the input voltage $V_{IN}$ at the first time period t1 to zero at a second time period t2 (see FIG. 3C). The secondary current discharges the second intrinsic diode capacitance $C_{D2}$ from the output voltage $V_O$ to zero. After the first voltage $V_A$ reaches zero, the second switch Q2 can be turned on at a third time period t3 with zero volts across it, clamping the first voltage $V_A$ at zero for the remainder of the second interval (see FIG. 3A). The voltage across the transformer T1 is now zero and the primary current $I_P$ now freewheels through the transformer T1, the second switch Q2 and the third switch Q3.

To start a third interval (beginning at time t6) for the first duty cycle D, the controller deactivates the third switch Q3 at a fourth time period t4, causing the leakage inductance $L_{LP}$ to resonate with the third and fourth parasitic capacitances C3, C4 (see FIG. 3B). The second voltage $V_B$ rings up to the input voltage $V_{IN}$ at a fifth time period t5 (see FIG. 3D). After the second voltage $V_B$ reaches the input voltage $V_{IN}$, the fourth switch Q4 can be turned on at a sixth time period t6 with zero volts across it, clamping the second voltage $V_B$ at the input voltage $V_{IN}$ for the remainder of the third interval (see FIG. 3B).

During the third interval, the second switch Q2 and the fourth switch Q4 are on. The voltage impressed across the primary winding 160 during the third interval is opposite in polarity to that of the first interval. The controller ends the third interval by turning off the second switch Q2. The signal transitions are similar to those at the end of the first interval, with the first and second nodes A, B, reversed.

During a fourth interval (not shown), the first switch Q1 is turned on and the primary current $I_P$, freewheels through the first switch Q1 and the fourth switch Q4. The controller turns off the fourth switch Q4 and turns on the third switch Q3 to return to the first interval. The alternate action of the first and third switches Q1, Q3, and the second and fourth switches Q2, Q4, during the first and third intervals, in conjunction with the zero voltage second and fourth intervals, operate to regulate the output voltage $V_O$.

The phase-shifted full bridge power converter 100 eliminates the ringing behavior suffered by the conventional bridge during the second and fourth intervals by clamping both ends of the transformer T1 to one rail, either the input voltage $V_{IN}$ or zero, such that the voltage across the transformer T1 is clamped at zero. The transformer T1, however, contains an intrinsic primary to secondary common-mode capacitance $C_{CM}$. By placing the potential of the primary winding 160 at zero or at the input voltage $V_{IN}$, the phase-shifted full bridge power converter 100 forces the potential across the common-mode capacitance $C_{CM}$ to change rapidly as the primary winding 160 flies between the voltage extremes, thereby generating a considerable amount of common-mode noise.

Figure 4:
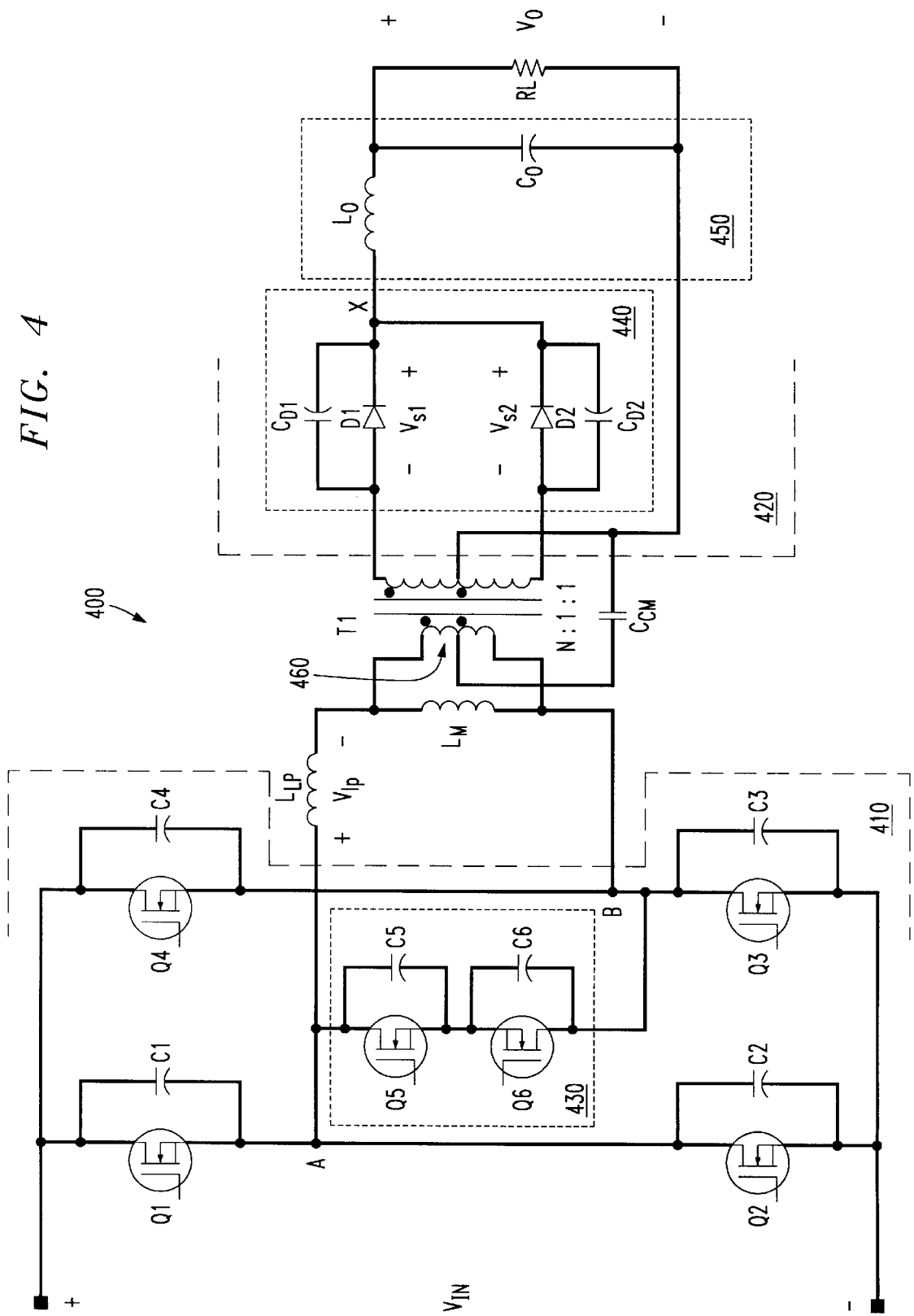
FIG. 4 illustrates an embodiment of a full bridge power converter constructed according to the principles of the present invention.

Turning now to FIG. 4, illustrated is an embodiment of a full bridge power converter 400 constructed according to the principles of the present invention. The full bridge power converter 400 is coupled to a source of electrical power (not shown) received from an input of the full bridge power converter 400 and provides power to a load (designated by resistor RL) coupled thereto. The full bridge power converter 400 includes a transformer T1, with a leakage inductance $L_{LP}$, a magnetizing inductance $L_M$, and an intrinsic primary to secondary common-mode capacitance $C_{CM}$. The transformer T1 has a primary winding 460 and two secondary windings of ordinarily the same turns ratio. The full bridge power converter 400 further includes a full bridge 410 and a secondary side circuit 420.

The full bridge 410 includes a first switch Q1, with a first parasitic capacitance C1, coupled to a first end of the primary winding 460. The full bridge 410 further includes a second switch Q2, with a second parasitic capacitance C2, also coupled to the first end of the primary winding 460. The full bridge 410 further includes a third switch Q3, with a third parasitic capacitance C3, coupled to a second end of the primary winding 460. The full bridge 410 further includes a fourth switch Q4, with a fourth parasitic capacitance C4, also coupled to the second end of the primary winding 460. The full bridge 410 still further includes a switching circuit 430 coupled across at least a portion of the primary winding 460 and used to decrease noise at an output of the full bridge power converter 400. In one embodiment of the invention, the switching circuit 430, capable of withstanding bipolar voltages equal to $\pm V_{IN}$, consists of a fifth switch Q5, with a fifth parasitic capacitance C5 and a sixth switch Q6, with a sixth parasitic capacitance C6, arranged back to back.

The secondary side circuit 420 includes a rectifier 440 consisting of a first rectifier diode D1, with a first intrinsic capacitance $C_{D1}$ and a second rectifier diode D2, with a second intrinsic capacitance $C_{D2}$, coupled to the secondary windings of the transformer T1. The secondary side circuit 420 further includes an output filter 450, having an inductive element $L_O$ and a capacitive element $C_O$, coupled to the rectifier 440 and the output of the power converter. The output filter 450 provides a filtered output voltage $V_O$ to the load RL.

The switches Q1, Q2, Q3, Q4, Q5, Q6 described above are illustrated as being metal-oxide semiconductor field effect transistors ("MOSFETs"), although those skilled in the art will understand that other types of controllable switches are within the broad scope of the present invention.

Figure 5A:
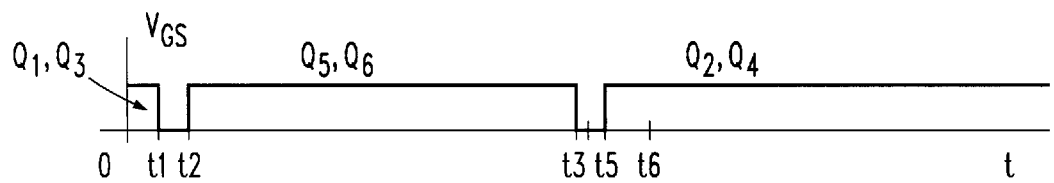
FIGS. 5A through 5G illustrate graphical representations of a plurality of switching transitions of selected elements of the full bridge of FIG. 4.
Figure 5B:
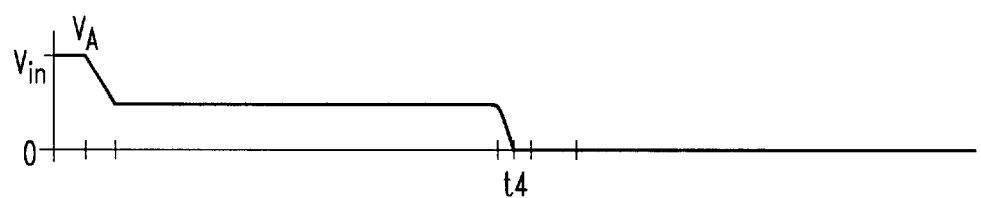
Figure 5C:
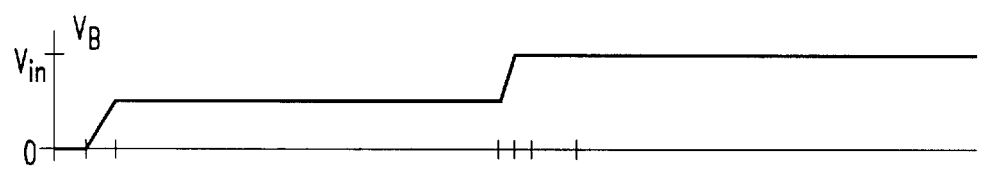
Figure 5D:
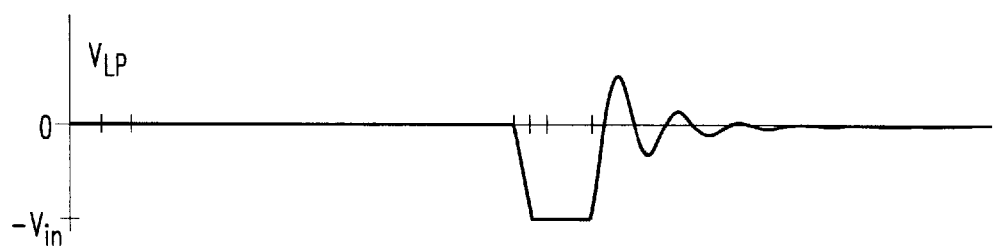
Figure 5E:
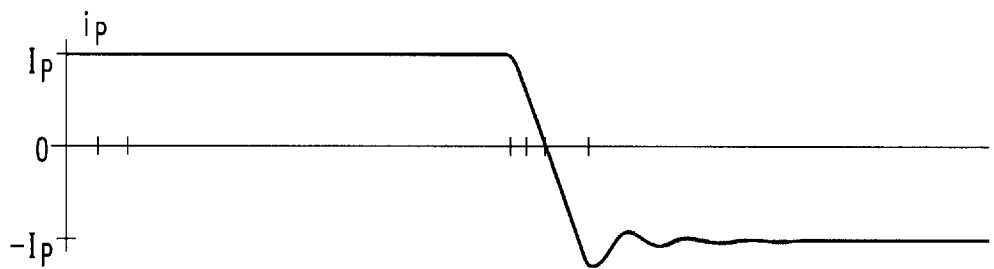
Figure 5F:
Figure 5G:
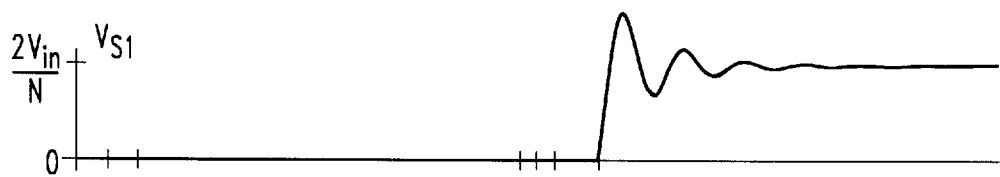

Turning now to FIGS. 5A through 5G, and with continuing reference to FIG. 4, illustrated are graphical representations of a plurality of switching transitions of selected elements of the full bridge power converter 400 of FIG. 4. In particular, FIG. 5A represents control voltages applied to the first, second, third, fourth, fifth and sixth switches Q1, Q2, Q3, Q4, Q5, Q6. FIG. 5B represents a first voltage $V_A$ at a first node A. FIG. 5C represents a second voltage $V_B$ at a second node B. FIG. 5D represents a leakage voltage $V_{LP}$ across the leakage inductance $L_{LP}$. FIG. 5E represents a primary current $I_P$ through the primary winding 460. FIG. 5G represents a first voltage $V_{S1}$ across the first rectifier diode D1. FIG. 5F represents a second diode voltage $V_{S2}$ across the second rectifier diode D2.

The full bridge power converter 400 operates generally as follows. The full bridge power converter 400 uses a pulse width modulation (PWM) controller (not shown) for providing control signals to regulate the switching cycles of the switches Q1, Q2, Q3, Q4, Q5, Q6 (see FIG. 5A). The controller activates the first and third switches Q1, Q3 during a first interval (prior to time t1), for a first duty cycle D, causing an input voltage $V_{IN}$ to be impressed across the primary winding 460 of the transformer T1. The first rectifier diode D1 is on, conducting a secondary current to the output filter 450.

During a second interval (time t1 to t5), for a second duty-cycle 1-D, the primary function is to set the voltage across the primary winding 460 to zero. The controller performs this function by simultaneously deactivating the first and third switches Q1, Q3 at the end of the first interval (at a first time period t1, see FIG. 5A).

Referring now to FIGS. 4, 5B, 5C, the primary current $I_P$ discharges the first, second, and fifth parasitic capacitances C1, C2, C5, resulting in the first voltage $V_A$ ringing down from the input voltage $V_{IN}$ toward zero. The primary current $I_P$ charges the third and fourth parasitic capacitances C3, C4 from zero toward the input voltage $V_{IN}$, resulting in the second voltage $V_B$ ringing up from zero toward the input voltage $V_{IN}$. The secondary current discharges the second intrinsic diode capacitance $C_{D2}$ from the output voltage $V_O$ to zero. When the first and second voltages $V_A$, $V_B$ reach a voltage half of the input voltage ($V_{IN}/2$) at a second time period t2, the voltage across the transformer T1 becomes zero. The controller closes the switching circuit 430, thereby terminating the charge and discharge of the first, second, third, and fourth parasitic capacitances C1, C2, C3, C4 and shorting the transformer T1. Closing the switching circuit 430 shorts the primary winding 460 thereby stabilizing the voltage across the transformer T1. The primary current $I_P$ now freewheels through the transformer T1 and the switching circuit 430.

Referring jointly to FIGS. 4, 5A, 5B, 5C, to end the second interval and start a third interval (beginning at time t5) for the first duty cycle D, the controller turns off the switching circuit 430 at a third time period t3. The leakage inductance $L_{LP}$ now resonates with the first, second, third, fourth, and sixth parasitic capacitances C1, C2, C3, C4, C6, causing the first voltage $V_A$ to ring to zero and the second voltage $V_B$ to ring to the input voltage $V_{IN}$ at a fourth time period t4. After the first voltage $V_A$ reaches zero and the second voltage $V_B$ reaches the input voltage $V_{IN}$, the second and fourth switches Q2, Q4 can be turned on at a fifth time period t5 with zero volts across the switches Q2, Q4.

During the third interval, the voltage impressed across the primary winding 460 is opposite in polarity to that of the first interval. To end the third interval and start a fourth interval (not shown), the controller turns off the second and fourth switches Q2, Q4. The signal transitions are similar to those at the end of the first interval, with the first and second nodes A, B reversed. After the first and second voltages $V_A$, $V_B$ reach half of the input voltage ($V_{IN}/2$), the voltage across the transformer T1 becomes zero. The controller turns on the switching circuit 430, terminating the charge and discharge of the first, second, third, fourth, and sixth parasitic capacitances C1, C2, C3, C4, C6 and shorting the transformer T1. For the remainder of the fourth interval, the primary current $I_P$ freewheels through the transformer T1 and the switching circuit 430. To end the fourth interval, the switching circuit 430 is turned off. The leakage inductance now resonates with the first, second, third, fourth, and fifth parasitic capacitances C1, C2, C3, C4, C5 to ring the first voltage $V_A$ up to the input voltage $V_{IN}$ and the second voltage $V_B$ down to zero. When the first voltage $V_A$ is substantially equal to the input voltage $V_{IN}$ and the second voltage $V_B$ is substantially equal to zero, the first and third switches Q1, Q3 may be turned off with zero volts across the switches Q1, Q3. The action of the first, second, third, and fourth switches Q1, Q2, Q3, Q4 in alternating pairs during the first and third intervals, in conjunction with the action of the switching circuit 430 during the zero voltage second and fourth intervals operate to regulate the output voltage $V_O$. Of course, those skilled in the art will realize that other methods of operating the switching circuit 430 is well within the broad scope of the present invention. An alternative method of operating the switching circuit 430 is disclosed in *A Novel Zero-Voltage-Switched Half-Bridge Converter with Active Current-Clamped Transformer*, by Koji Yoshida, et al., IEEE Power Electronics Specialists Conference Record, pp. 632–636 (June 1996), incorporated herein by reference.

In the conventional full bridge power converter, disabling the two diagonal switches (Q1 and Q3, or Q2 and Q4) first initiates a constant current discharge of the associated parasitic capacitances at the first and second nodes A, B by the primary current $I_P$ and of one intrinsic diode capacitance ($C_{D1}$ or $C_{D2}$) by the secondary current. When the transformer voltage falls to zero ($V_A=V_B=V_{IN}/2$), the rest of the switching transition is achieved by a resonance between the leakage inductance $L_{LP}$ and the parasitic capacitances. Thus, in the conventional full bridge power converter, the constant current charge and discharge of the first and second nodes A, B is immediately followed by the resonant ring. (See FIG. 2, time t2 to t5).

The resonant ring has two distinct components. The first ring (see FIG. 2, time t2 to t3) is exploited in the full bridge power converter 100 and the full bridge power converter 400 to effect lossless zero-voltage switching. The second ring, (between time t4 and t5) is responsible for switching losses and switching noise. Both the full bridge power converter 100 and the full bridge power converter 400 reduce or eliminate this second ring by actively clamping the voltage across the transformer T1 at zero. The reduction or elimination of the second ring provides cleaner waveforms, less radiated and conducted electromagnetic interference, and better efficiency than in the conventional full bridge power converter.

Though both the full bridge power converter 100 and the full bridge power converter 400 clamp the voltage across the transformer T1 at zero, the power converters 100, 400 perform this operation in different ways. In the full bridge power converter 100, the free-wheeling phase operates with the potentials of the first and second nodes $V_A$, $V_B$, first at zero and then at the input voltage $V_{IN}$. The potential across the intrinsic primary to secondary common-mode capacitance $C_{CM}$ changes rapidly as the primary of the transformer T1 flies between the voltage extremes, generating a considerable amount of common-mode noise. In contrast, the full bridge power converter 400 free-wheels with the first and second nodes $V_A$, $V_B$ at half of the input voltage $V_{IN}/2$. Since the center point of the primary winding 460 is always at a potential of half the input voltage $V_{IN}/2$, the potential across the intrinsic primary to secondary common-mode capacitance $C_{CM}$ changes less, and the common-mode noise generated is less. The full bridge power converter 400 therefore exhibits a reduction in common-mode transformer noise over that of the full bridge power converter 100 while maintaining its reduced or non-existent switching losses and switching noise.

Those skilled in the art should understand that the previously described embodiment of the full bridge power converter (and novel circuit employed therein) is submitted for illustrative purposes only, and other embodiments capable of decreasing noise at an output of the power converter are well within the broad scope of the present invention. For a better understanding of power electronics, power converter topologies, such as the full bridge and the phase-shifted full bridge power converters, see *Principles of Power Electronics*, by J. Kassakian, M. Schlecht, Addison-Wesley Publishing Company (1991); *The Design of Front-End DC—DC Converters of Distributed Power Supply Systems With Improved Efficiency and Stability*, by L. H. Mweene, ScD Thesis, Massachusetts Institute of Technology (September 1992) and *A 1 kW 500 kHz Front-End Converter for a Distributed Power Supply System*, by L. H. Mweene, et al., IEEE Trans. Power Electronics, pp. 398–407 (July 1991). The aforementioned references are incorporated herein by reference.

Although the present invention and its advantages have been described in detail, those skilled in the art should understand that they can make various changes, substitutions and alterations herein without departing from the spirit and scope of the invention in its broadest form.

What is claimed is:

1. For use in a power converter having a controlled full bridge coupled to a transformer, said bridge delivering power received from an input of said power converter to a primary winding of said transformer, a circuit for decreasing conducted and radiated electromagnetic interference of said power converter, comprising:
    a switching circuit, coupled across at least a portion of said primary winding, that closes to short said portion as a function of a state of said full bridge to stabilize a voltage level of said primary winding.

2. The circuit as recited in claim 1 wherein said full bridge is pulse width modulation (PWM)-controlled.

3. The circuit as recited in claim 1 wherein said power converter further has a controller and said full bridge contains switches that intermittently couple said primary winding to said input of said power converter, said controller providing control signals to said switching circuit and said switches in said full bridge.

4. The circuit as recited in claim 1 wherein said power converter further has an output filter interposed between a secondary winding of said transformer and said output of said power converter.

5. The circuit as recited in claim 1 wherein said power converter further has a controller and said full bridge comprises four switches controlled by said controller in alternating pairs to deliver power received from said input of said power converter to said primary winding.

6. The circuit as recited in claim 1 wherein said switching circuit comprises two back to back metal-oxide semiconductor field effect transistors (MOSFETs).

7. The circuit as recited in claim 1 wherein said switching circuit closes to short said portion when said voltage level of said primary winding is substantially half of an input voltage of said power converter.

8. For use in a power converter having a controlled full bridge coupled to a transformer, said bridge delivering power received from an input of said power converter to a primary winding of said transformer, a method of decreasing conducted and radiated electromagnetic interference of said power converter, comprising the steps of:
    closing a switching circuit coupled across at least a portion of said primary winding; and
    shorting said portion as a function of a state of said full bridge to stabilize a voltage level of said primary winding.

9. The method as recited in claim 8 further comprising the step of pulse width modulation (PWM)-controlling said full bridge.

10. The method as recited in claim 8 wherein said power converter further has a controller and said full bridge contains switches, said method further comprising the step of:
    intermittently coupling said primary winding to said input of said power converter; and
    providing control signals from said controller to said switching circuit and said switches in said full bridge.

11. The method as recited in claim 8 further comprising the step of filtering said power in an output filter interposed between a secondary winding of said transformer and said output of said power converter.

12. The method as recited in claim 8 wherein said power converter further has a controller and said full bridge comprises four switches, said method further comprising the step of controlling said four switches in alternating pairs to deliver power received from said input of said power converter to said primary winding.

13. The method as recited in claim 8 wherein said switching circuit comprises two back to back metal-oxide semiconductor field effect transistors (MOSFETs).

14. The method as recited in claim 8 wherein said step of closing comprises the step of closing said switching circuit to short said portion when said voltage level of said primary winding is substantially half of an input voltage of said power converter.

15. A power converter, comprising:
    a full bridge, coupled to an input of said power converter;
    a pulse width modulation (PWM) controller, coupled to said full bridge, to provide PWM control signals thereto;
    a transformer, coupled to said full bridge, to receive power from said full bridge into a primary winding thereof; and
    a circuit for decreasing conducted and radiated electromagnetic interference of said power converter, including:
    a switching circuit, coupled across at least a portion of said primary winding and controlled by said controller, that closes to short said portion as a function of a state of said full bridge to stabilize a voltage level of said primary winding.

16. The power converter as recited in claim 15 wherein said full bridge contains switches that intermittently couple said primary winding to said input of said power converter.

17. The power converter as recited in claim 15 wherein said power converter further has an output filter interposed between a secondary winding of said transformer and said output of said power converter.

18. The power converter as recited in claim 15 wherein said full bridge comprises four switches controlled by said controller in alternating pairs to deliver power received from said input of said power converter to said primary winding.

19. The power converter as recited in claim 15 wherein said switching circuit comprise two back to back metal-oxide semiconductor field effect transistors (MOSFETs).

20. The power converter as recited in claim 15 wherein said switching circuit closes to short said portion when said voltage level of said primary winding is substantially half of an input voltage of said power converter.

* * * * *